United States Patent
Noll

(10) Patent No.: US 8,643,982 B2
(45) Date of Patent: Feb. 4, 2014

(54) DISCRETE INPUT SIGNAL GENERATION VIA OUTPUT SHORT-CIRCUIT DETECTION

(75) Inventor: Christopher Noll, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 177 days.

(21) Appl. No.: 13/053,183

(22) Filed: Mar. 21, 2011

(65) Prior Publication Data
US 2012/0243128 A1 Sep. 27, 2012

(51) Int. Cl.
*H02H 7/00* (2006.01)
*H02H 9/00* (2006.01)

(52) U.S. Cl.
USPC .......................................................... 361/18

(58) Field of Classification Search
USPC .......................................................... 361/18
See application file for complete search history.

(56) References Cited

U.S. PATENT DOCUMENTS

| | | | |
|---|---|---|---|
| 6,107,926 A * | 8/2000 | Kifuku et al. ................ | 340/650 |
| 2005/0083066 A1 * | 4/2005 | Tani et al. .................... | 324/509 |
| 2007/0126289 A1 | 6/2007 | Liu et al. | |
| 2008/0046152 A1 * | 2/2008 | Ohtake et al. ................ | 701/49 |
| 2010/0066174 A1 * | 3/2010 | Dommaschk et al. ......... | 307/75 |

FOREIGN PATENT DOCUMENTS

| | | |
|---|---|---|
| EP | 1750486 A1 | 2/2007 |
| EP | 1879430 A1 | 1/2008 |

OTHER PUBLICATIONS

The extended European Search Report of related European Application No. 12159624.1 filed Mar. 15, 2012.

* cited by examiner

*Primary Examiner* — Dharti Patel
(74) *Attorney, Agent, or Firm* — Kinney & Lange, P.A.

(57) ABSTRACT

A controller has an output for supplying power to an output device. The controller monitors the supplied power to provide short-circuit protection to the output device. The controller also receives discrete inputs at the output based on the introduction of temporary short-circuit conditions introduced by a momentary switch connected between outputs of the controller in parallel with the output device. The controller detects short-circuit conditions in the output and distinguishes between short-circuit fault conditions and discrete inputs generated by activation of the momentary switch based on measured characteristics of the detected short-circuit conditions.

18 Claims, 4 Drawing Sheets

DISCRETE INPUT SIGNAL GENERATION VIA OUTPUT SHORT-CIRCUIT DETECTION

BACKGROUND

The present invention is related to driver circuits that supply power to output devices.

"Driver circuit" is a generic term for a circuit tasked with supplying power to a load device. A driver circuit may include analog and/or digital circuitry for controlling the supply of power to the load device, and includes circuitry for detecting and protecting attached devices from short-circuit faults.

SUMMARY

A controller includes a driver circuit for supplying power to an output device. The driver circuit monitors the power supplied to detect short-circuit conditions at the output. Discrete inputs are generated by introducing intentional short-circuit conditions at the output of the driver circuit. The driver circuit detects short-circuit conditions at the output and interpretation logic distinguishes between short-circuit fault conditions and discrete inputs based on monitored characteristics of the detected short-circuit condition.

DETAILED DESCRIPTION

A driver circuit controls the supply of power from an output of the driver circuit to a load device. In addition, the driver circuit is capable of detecting/receiving discrete input signals at the output of the driver circuit generated by the activation of one or more momentary switch devices. Activation of the one or more momentary switch devices creates a short-circuit condition at the output of the driver circuit that can be detected and distinguished by the driver circuit from short-circuit fault conditions.

Figure 1:
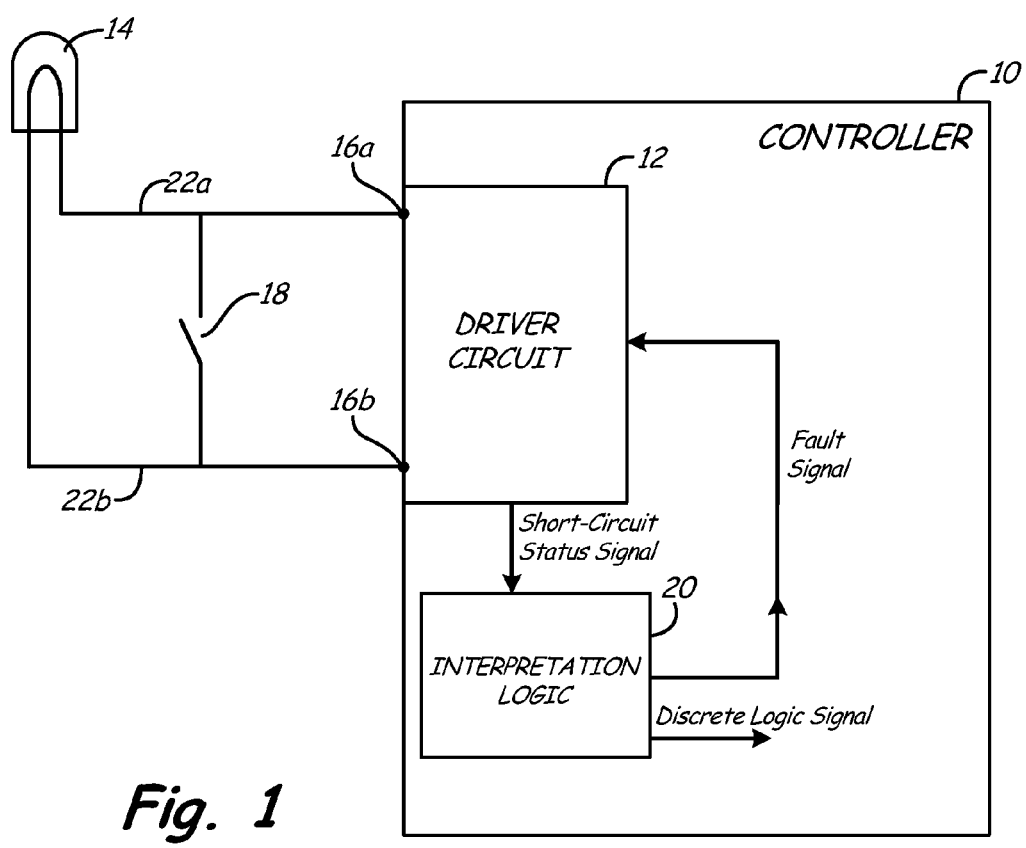
FIG. 1 is a schematic diagram of a controller that includes a driver circuit connected to supply power to a load and to detect discrete inputs according to an embodiment of the present invention.

FIG. 1 is a schematic diagram of controller 10 that includes driver circuit 12 connected to supply power to load device 14 (also referred to as output device 14) from output terminals 16a, 16b and to detect discrete inputs at these terminals according to an embodiment of the present invention. Momentary switch 18 is connected between wires 22a and 22b and in parallel with output device 14. Driver circuit 12 monitors the output supplied to output device 14 for short-circuit conditions, and provides a signal to interpretation logic 20 indicating whether a short-circuit condition is present. Interpretation logic 20 determines, based on characteristics of the short-circuit condition (e.g., duration, frequency, etc.), whether the short-circuit condition is a short-circuit fault condition or a discrete input generated by the activation of momentary switch 18.

Momentary switch 18 creates an open-circuit between wires 22a and 22b when in an open or non-activated state, such that power flows in a circuit path from output terminals 16a and 16b to output device 14. However, momentary switch 18 creates a short-circuit path between wires 22a and 22b (and therefore between output terminals 16a and 16b) when closed or activated. Momentary switch 18 may be implemented using a number of well-known switching technologies, as long as the short-circuit connection provided by momentary switch 18 provides a characteristic short-circuit condition that can be distinguished from short-circuit fault conditions.

For example, momentary switch 18 may be implemented as an electromechanical switch, in which a user physically activates the switch by pressure or force, and wherein the switch maintains contact for a limited duration before returning to the inactive state. In this embodiment, interpretation logic 20 identifies discrete inputs based on the (relatively) short duration of the short-circuit condition created by activation of the momentary switch 18. In other embodiments, momentary switch is a solid-state device coupled with a sensor that detects a desired activation state and in response turns the solid-state device On to create a short-circuit condition between output terminals 16a and 16b.

A short-circuit condition, either due to a short-circuit fault condition in output device 14, a short-circuit fault between wires 22a and 22b, or an intentional short-circuit created by activating momentary switch 18, is detected by driver circuit 12. The characteristics of a short-circuit fault condition (associated with output device 14 or between wires 22a and 22b) is different than the characteristics of a short-circuit condition created by the activation of momentary switch 18. By monitoring short-circuit conditions at the output of driver circuit 12, the driver circuit 12, in combination with interpretation logic 20 is able to distinguish between short-circuit faults and discrete inputs created by the activation of momentary switch 18.

For example, short-circuit fault conditions are typically non-transient events, in which the short-circuit condition persists for a period of time longer than the short-circuit condition resulting from the closing of momentary switch 18. By measuring the duration of detected overcurrent conditions, interpretation logic 20 is able to distinguish between short-circuit fault conditions and discrete inputs provided by momentary switch 18. A benefit of the configuration described with respect to FIG. 1, is a discrete input is provided at output terminals 16a, 16b of controller 10 without requiring additional terminal connections and separate power supply requirements. This reduces the size and cost of controller 10.

In the embodiment shown in FIG. 1, driver circuit 12 is responsible for the provision of power to output device 14 and monitoring of the provided current for overcurrent conditions. In one embodiment, driver circuit 12 monitors the current at terminals 16a, 16b and compares the monitored current to a threshold value. If the monitored current exceeds the threshold value, then driver circuit 12 generates a short-circuit status signal that is provided to interpretation logic 20.

Interpretation logic 20 includes logic for distinguishing between short-circuit fault conditions and discrete inputs provided via momentary switch 18 based on characteristics of the short-circuit condition monitored and reported by driver circuit 12. Interpretation logic 20 provides a fault signal output to driver circuit 12 that indicates whether a short-circuit fault condition is present, and a logic value output that indicates whether momentary switch 18 has been activated. The logic value output may be employed internally within controller 10, or may be communicated by controller 10 to an external controller (not shown) for processing. Interpretation logic 20, and the functions performed by interpretation logic 20, may be implemented with discrete analog and/or digital circuits, field programmable gate arrays (FPGAs), software executed on a microprocessor or machine, or combinations thereof.

Figure 2:
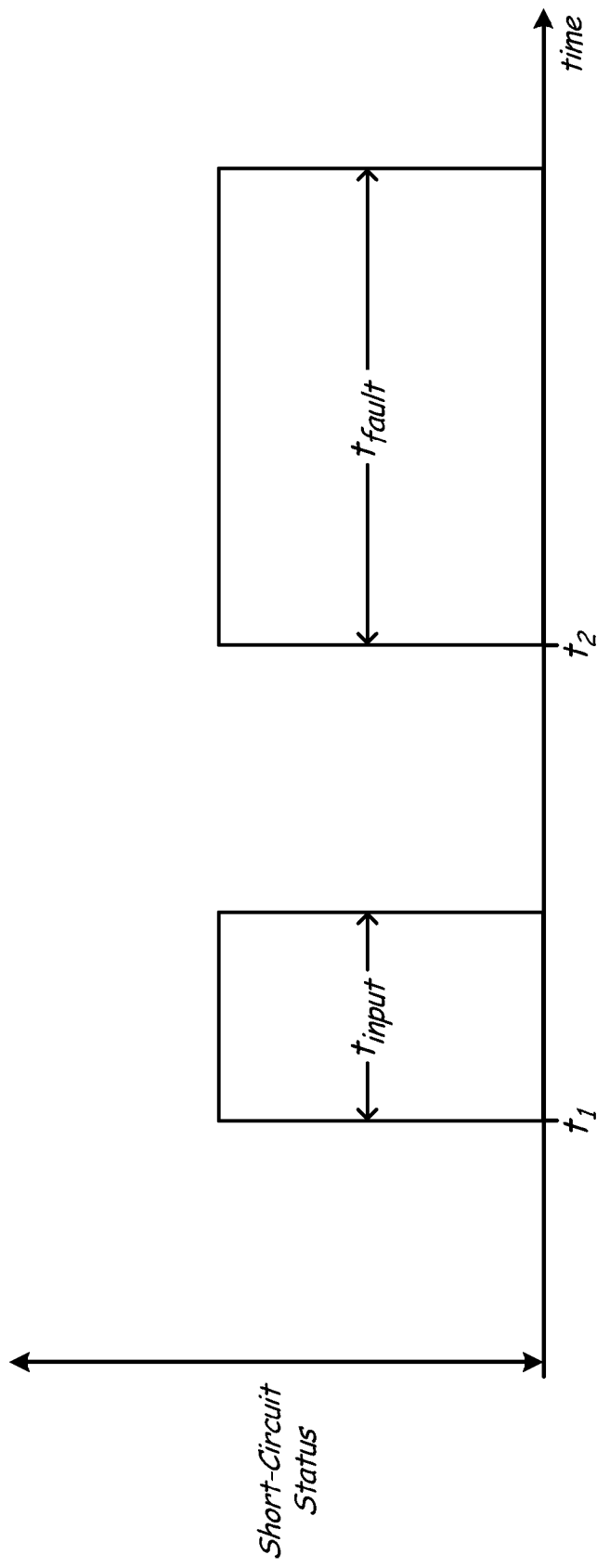
FIG. 2 is a waveform that illustrates distinguishing characteristics between a short-circuit fault and a discrete input according to an embodiment of the present invention.

FIG. 2 is a waveform illustrating the difference between a short-circuit fault and a discrete input. On the vertical axis of the waveform shown in FIG. 2 is the short-circuit status signal provided by driver circuit 12 to interpretation logic 20. The short-circuit status signal is high when driver circuit 12 has detected a short-circuit condition at output terminals 16a, 16b. The short-circuit status signal is low when no short-circuit condition has been detected by driver circuit 12.

In the embodiment shown in FIG. 2, a first short-circuit condition is detected at time t1 and has a duration defined as $t_{input}$. A second short-circuit condition is detected at time t2 and has a duration defined as $t_{fault}$. The duration of the first short-circuit condition is less than the duration of the second short-circuit condition (i.e., $t_{input} < t_{fault}$). In this embodiment, the duration of the first short-circuit condition indicates that the condition is not a fault condition, but rather a discrete input generated by the temporary actuation of momentary switch 18. The duration of the second short-circuit waveform indicates that the second short-circuit condition is a short-circuit fault condition.

Figure 3:
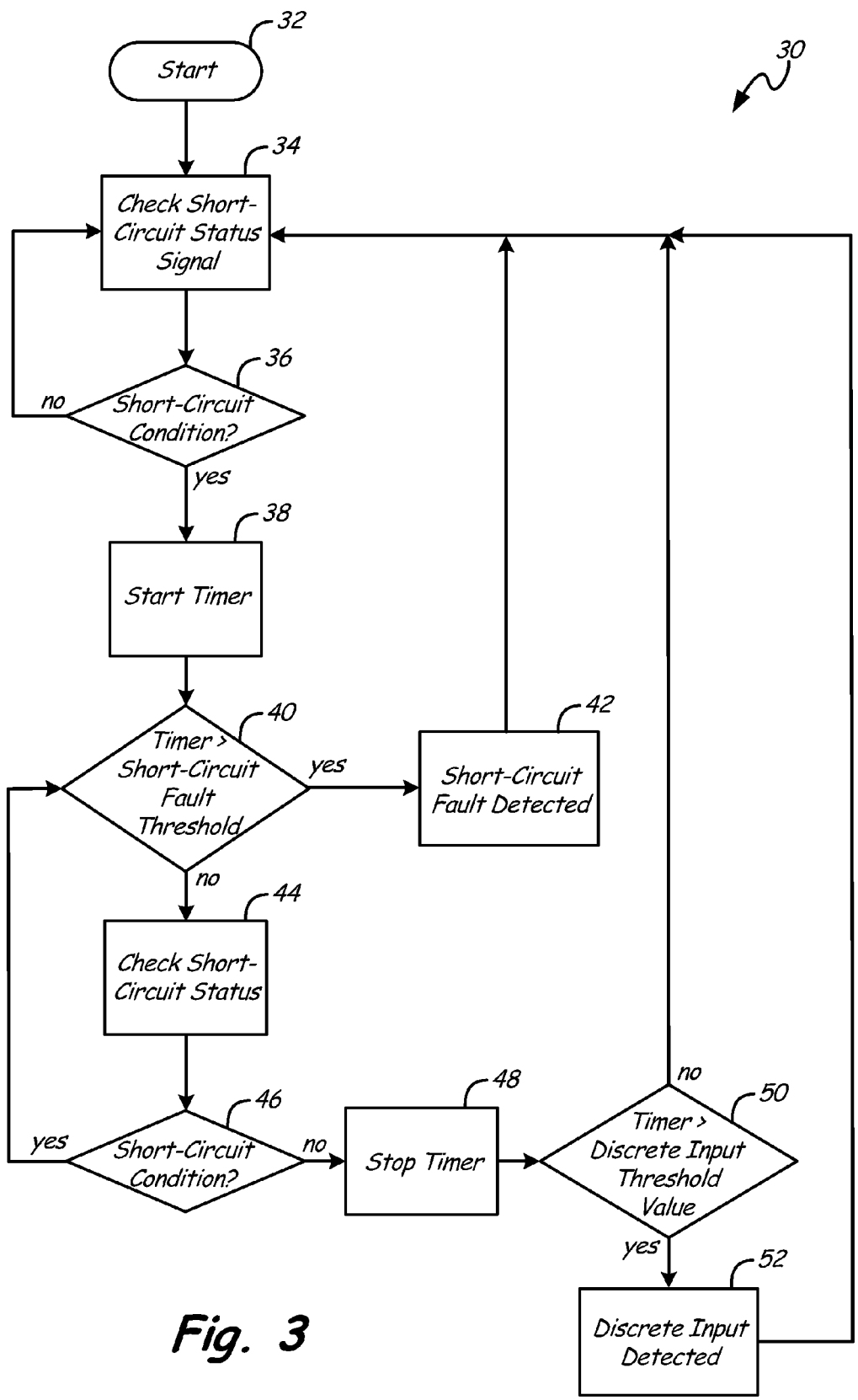
FIG. 3 is a flowchart that illustrates a method of distinguishing between short-circuit faults and discrete inputs according to an embodiment of the present invention.

FIG. 3 is a flowchart that illustrates a method 30 of distinguishing between short-circuit faults and discrete inputs according to an embodiment of the present invention. These steps are performed by interpretation logic 20 (shown in FIG. 1), and may be implemented by discrete circuitry, field-programmable gate arrays (FPGAs), or software executed by a processor/microprocessor.

The process begins at step 32. At step 34, interpretation logic 20 checks the short-circuit status signal provided by driver circuit 12 (shown in FIG. 1).

At step 36, interpretation logic 20 determines whether the short-circuit status signal indicates a short-circuit condition. If the short-circuit status signal does not indicate a short-circuit condition, then the process returns to step 34 to check the short-circuit status signal. If the short-circuit status signal does indicate a short-circuit condition, then at step 38 interpretation logic 20 starts a timer (not shown).

At step 40, the timer value is compared to a short-circuit fault threshold time. If the timer value is greater than the short-circuit fault threshold time, this is indicative of a short-circuit fault condition (i.e., not a discrete input signal). In response to the timer value being greater than the short-circuit fault threshold, then at step 42 interpretation logic 20 generates a short-circuit fault signal that is provided to driver circuit 12. In some embodiments, in response to a detected short-circuit fault, driver circuit 12 will remove output power from output device 14 for a period of time, and then re-apply power. Thus, after generating the short-circuit fault signal, the process continues at step 34 to check the short-circuit status provided by driver circuit 12.

If at step 40, the timer value is not greater than the short-circuit fault threshold then at step 44 interpretation logic 20 checks the short-circuit status signal provided by driver circuit 12. At step 46, interpretation logic 20 determines whether the short-circuit status signal is still indicating the presence of a short-circuit fault. If the short-circuit status signal indicates the short-circuit fault is still present, then the process returns to step 40, wherein the timer value is compared to the short-circuit fault threshold value. In this way, once the timer value exceeds the short-circuit fault threshold value, even if the short-circuit status signal still persists, a short-circuit fault condition is detected and appropriate signal is generated (at step 42).

At step 46, if the short-circuit status signal indicates that the short-circuit condition no longer persists, then at step 48 the timer is stopped.

At step 50, the timer value is compared to a discrete input threshold value. If the timer is greater than the discrete input threshold value then at step 52 a logic value is generated that indicates detection of a discrete input signal (i.e., activation of momentary switch 18).

If the timer value is less than the discrete input threshold value, this is indicative that no discrete input signal is present (i.e., there was no activation of momentary switch 18), and the process continues at step 34 with interpretation logic 20 checking the short-circuit status signal. In the embodiment described with respect to FIG. 3, interpretation logic 20 detects a discrete input only when the timer value is less than the short-circuit fault threshold value and greater than the discrete input threshold value, although in other embodiments the algorithm employed may be modified, so long as a distinction can be made between characteristics of short-circuit fault conditions, and discrete input signals.

Figure 4:
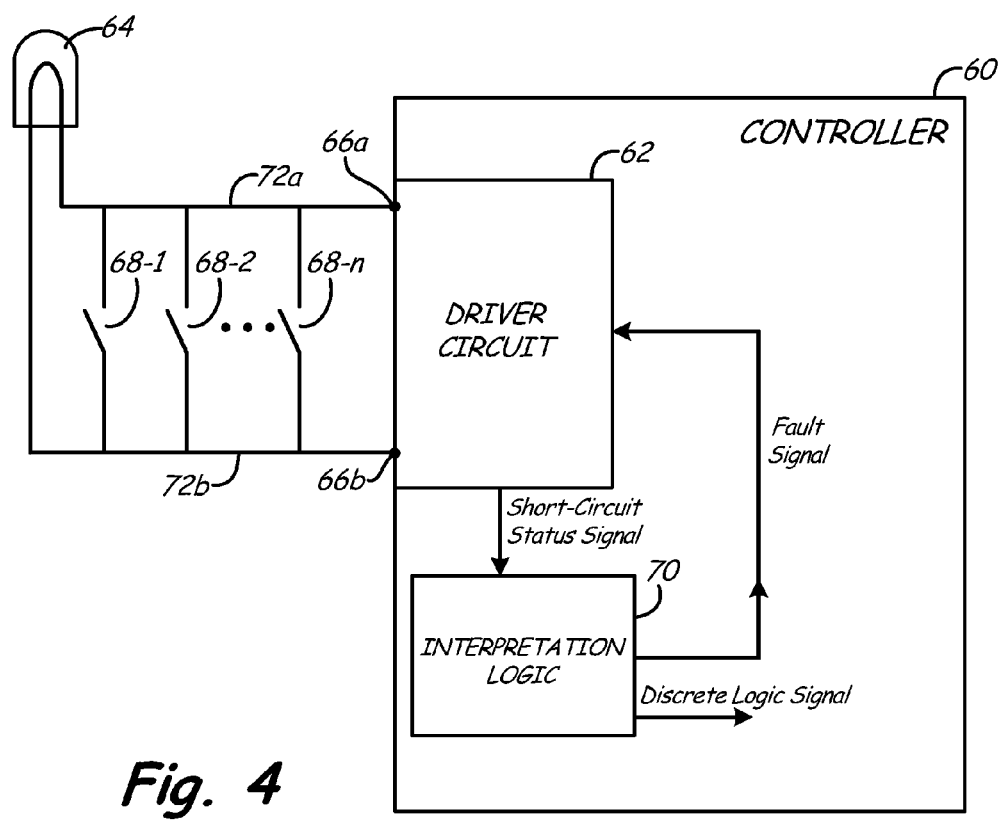
FIG. 4 is a schematic diagram of a controller that includes a driver circuit connected to supply power to a load and to detect discrete inputs according to another embodiment of the present invention.

FIG. 4 is a schematic diagram of a controller 60 that includes a driver circuit 62 connected to supply power to a load device 64 (also referred to as output device 64) and to detect discrete inputs according to another embodiment of the present invention. Similar to the embodiment described with respect to FIG. 1, driver circuit 62 supplies power via output terminals 66a and 66b and wires 72a and 72b to load device 64.

However, instead of a single momentary switch connected between output terminals 66a and 66b, a plurality of momentary switches 68-1, 68-2, . . . 68n (collectively, momentary switches 68) connected in parallel between terminals 66a and 66b. In order to distinguish between activation of the plurality of momentary switches 68, each momentary switch is characterized by a different activation characteristic (e.g., each switch creates a short-circuit path that persists for a different duration of time).

Driver circuit 62 provides power to output device 64 via terminals 66a and 66b and wires 72a and 72b, respectively. Driver circuit 62 detects short-circuit conditions. As described above, various methods may be employed to detect short-circuit conditions, such as by monitoring the output current provided to load device 64, monitoring the dissipation of thermal energy associated the supply of power to load device 64, monitoring impedance associated with the load (e.g., wherein a short-circuit is detected by a decrease in the monitored impedance) as well as other well-known methods. Driver circuit 62 creates a short-circuit status signal that is provided to interpretation logic 70, which uses characteristics of the detected short-circuit condition (e.g., frequency time duration) to distinguish between short-circuit fault conditions and discrete inputs provided by one of the plurality of momentary switches 68.

In one example, interpretation logic 70 includes logic for distinguishing between short-circuit fault conditions and discrete inputs provided via momentary switches 68 based on the duration of the short-circuit status signal provided by driver circuit 62. In this embodiment, each of the plurality of momentary switches 68 has a unique activation period (i.e., creates a short-circuit condition between terminals 66a and 66b for a unique duration of time). The unique activation period of each momentary switch allows interpretation logic 70 to distinguish, not only between short-circuit fault conditions and discrete inputs, but between the plurality of discrete inputs provided via momentary switches 68.

Interpretation logic 70 provides a fault signal output to driver circuit 62 that indicates whether a short-circuit fault condition is present, and one or more discrete logic value outputs that indicate which of the plurality of momentary switches 68 have been activated. The discrete logic values may be employed internally within controller 60, or may be communicated by controller 60 to an external controller (not shown) for processing.

In this way, a driver circuit is able to take advantage of short-circuit detection/protection mechanisms commonly employed to monitor the output provided by the circuit to a particular load to convey discrete inputs to the circuit. The discrete input(s) is generated by a momentary switch connected at the output of the driver circuit that is capable of generating a temporary short-circuit at the output. Circuitry associated with the driver circuit distinguishes between characteristics of a short-circuit fault and the short-circuit condition created by activation of the momentary switch. In this way, discrete inputs are communicated to the output of the driver circuit without requiring additional pins or wiring.

While the invention has been described with reference to an exemplary embodiment(s), it will be understood by those skilled in the art that various changes may be made and equivalents may be substituted for elements thereof without departing from the scope of the invention. For example, the functionality of the controller described with respect to FIGS. 1 and 4 was divided into control/detection functions provided by the driver circuit and distinguishing functions performed by the interpretation logic. In other embodiments, these functions may be performed by a single device, or further bifurcated into additional separate devices. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller having an output for supplying power to an output device and for receiving discrete inputs based on selective activation of a momentary switch connected in parallel with the output device, the controller comprising:
   first and second output terminals for supplying power to the output device;
   a driver circuit connected to control the supply of power to the output device and to detect short-circuit conditions in power supplied to the output device; and
   interpretation logic that distinguishes between short-circuit fault conditions and discrete inputs generated in response to activation of the momentary switch based on characteristics of short-circuit conditions detected by the driver circuit.

2. The controller of claim 1, wherein the characteristics of the short-circuit conditions used to distinguish short-circuit faults from discrete inputs include duration of the short-circuit conditions and/or frequency of the short-circuit conditions.

3. The controller of claim 1, wherein the interpretation logic detects a short-circuit fault condition if a duration of the detected short-circuit condition exceeds a short-circuit fault threshold value.

4. The controller of claim 3, wherein the interpretation logic detects a discrete input if a duration of the detected short-circuit condition is greater than a discrete input threshold value and less than the short-circuit fault threshold value.

5. The controller of claim 1, wherein the interpretation logic distinguishes between discrete inputs generated by each of a plurality of momentary switches connected in parallel and with the output device based on characteristics of detected short-circuit conditions, wherein each of the plurality of momentary switches is defined by a unique activation period that determines the characteristics of the short-circuit condition generated by each momentary switch.

6. An electrical system for supplying power to a load device, the system comprising:
   a controller connected to supply power to the load via first and second terminals and to detect short-circuit conditions in the power supplied to the load; and
   a momentary switch connected in parallel with the load device between the first and second terminals, wherein the momentary switch creates a short-circuit condition between the first and second terminals when activated, wherein the controller distinguishes between a short-circuit fault condition and a discrete input generated by activation of the momentary switch based on monitored characteristics of detected short-circuit conditions.

7. The electrical system of claim 6, wherein the momentary switch is a mechanical switch that provides an electrical connection between terminals of the switch for a fixed duration of time.

8. The electrical system of claim 6, wherein the controller includes:
   a driver circuit that monitors power supplied to the load and generates a short-circuit status signal indicating the presence of a short-circuit condition detected in the supply of power to the load.

9. The electrical system of claim 8, wherein the controller further includes:
   interpretation logic that differentiates between short-circuit fault conditions and discrete inputs generated in response to the activation of the momentary switch based on a measured duration of the short-circuit status signal.

10. The electrical system of claim 9, wherein the interpretation logic generates a short-circuit fault signal in response to the measured duration of the short-circuit status signal exceeding a short-circuit fault threshold value.

11. The electrical system of claim 10, wherein the interpretation logic generates a logic signal indicating activation of the momentary switch in response to the measured duration of the short-circuit status signal exceeding a discrete input threshold value and being less than the short-circuit fault threshold value.

12. The electrical system of claim 6, further including a plurality of momentary switches connected in parallel with one another, wherein the activation of each of the plurality of momentary switches creates a unique short-circuit fault characteristic that allows the controller to distinguish between discrete inputs generated by each of the plurality of momentary switches.

13. A method of distinguishing between short-circuit fault conditions and discrete inputs generated by activation of a momentary switch that creates a momentary short-circuit condition, the method comprising:
   supplying power to an output device connected in parallel to the momentary switch;
   detecting a short-circuit condition in a supply of power to a load device;

monitoring characteristics of the short-circuit condition; and distinguishing between discrete inputs generated by activation of the momentary switch and short-circuit fault conditions based on the monitored characteristics of the short-circuit condition.

14. The method of claim 13, wherein detecting the short-circuit condition includes:

monitoring current supplied to the load device; and comparing the monitored current to a threshold value to detect short-circuit conditions.

15. The method of claim 13, wherein detecting the short-circuit condition includes at least one of monitoring thermal energy, monitoring impedance, and monitoring of current supplied to the load device.

16. The method of claim 13, wherein monitoring characteristics of the short-circuit condition includes measuring a duration of the short-circuit condition.

17. The method of claim 16, wherein distinguishing between short-circuit fault conditions and discrete inputs generated by activation of the momentary switch further includes:

comparing the measured duration of the short-circuit status signal to a short-circuit fault threshold value; and generating a short-circuit fault condition if the duration of the short-circuit status signal is greater than the short-circuit fault threshold.

18. The method of claim 17, wherein distinguishing between short-circuit fault conditions and discrete inputs generated by activation of the momentary switch further includes:

comparing the measured duration of the short-circuit status signal to a discrete input threshold value; and generating a discrete input logic signal if the duration of the short-circuit status signal is greater than the discrete input threshold value and less than the short-circuit fault threshold.

* * * * *